United States Patent
Yang et al.

(10) Patent No.: US 10,333,748 B2
(45) Date of Patent: Jun. 25, 2019

(54) ADAPTIVE PARAMETER ADJUSTMENT METHOD FOR HYBRID PRECODING MILLIMETER-WAVE TRANSMISSION SYSTEM

(71) Applicant: Shanghai Research Center for Wireless Communications, Shanghai (CN)

(72) Inventors: Xiu-mei Yang, Shanghai (CN); Wu-xiong Zhang, Shanghai (CN); Meng-ying Zhang, Shanghai (CN); Yang Yang, Shanghai (CN); Hai-feng Wang, Shanghai (CN)

(73) Assignee: SHANGHAI RESEARCH CENTER FOR WIRELESS COMMUNICATIONS, Shanghai (CN)

( * ) Notice: Subject to any disclaimer, the term of this patent is extended or adjusted under 35 U.S.C. 154(b) by 12 days.

(21) Appl. No.: 15/671,985

(22) Filed: Aug. 8, 2017

(65) Prior Publication Data

US 2018/0191535 A1 Jul. 5, 2018

(30) Foreign Application Priority Data

Dec. 31, 2016 (CN) .......................... 2016 1 1269597

(51) Int. Cl.
*H04L 25/03* (2006.01)
*H04B 7/06* (2006.01)
(Continued)

(52) U.S. Cl.
CPC ..... *H04L 25/03961* (2013.01); *H04B 7/0693* (2013.01); *H04B 7/0877* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2005/0096058 A1* | 5/2005 | Warner | H04B 7/0608 455/446 |
| 2009/0080547 A1* | 3/2009 | Naka | H04B 7/0604 375/260 |

(Continued)

OTHER PUBLICATIONS

Ran Zi et al: "Energy Efficiency Optimization of 5G Radio Frequency Chain Systems", arx1v.org, Cornell University Library, 201 Olin Library Cornell University Ithaca, NY 14853, Apr. 10, 2016 (Apr. 10, 2016), XP080694444.

(Continued)

*Primary Examiner* — Junpeng Chen
(74) *Attorney, Agent, or Firm* — JMB Davis Ben-David

(57) ABSTRACT

The present invention discloses an adaptive parameter adjustment method for a hybrid precoding millimeter-wave transmission system. The method includes the following step: interacting between a transmitter and a receiver for a number of radio frequency chains that need to be established. The receiver calculates, according to a received signal power at the time of established a different number of radio frequency chains and a total power consumption at the time of established the different number of radio frequency chains, the number of the radio frequency chains that need to be established. According to the present invention, under a condition of balancing power consumption and a rate, a number of radio frequency chains that need to be established is adaptively selected, so as to optimally configure power consumption and a transmission rate in a millimeter-wave transmission system.

9 Claims, 1 Drawing Sheet

(51) Int. Cl.
    *H04B 7/08*     (2006.01)
    *H04B 17/309*     (2015.01)
    *H04W 52/02*     (2009.01)
    *H04B 7/0456*     (2017.01)

(52) U.S. Cl.
    CPC ........ *H04B 17/309* (2015.01); *H04W 52/028* (2013.01); *H04W 52/0229* (2013.01); *H04W 52/0245* (2013.01); *H04B 7/0456* (2013.01); *H04B 7/0617* (2013.01); *H04B 7/0623* (2013.01); *H04B 7/0848* (2013.01); *H04W 52/0283* (2013.01); *Y02D 70/00* (2018.01); *Y02D 70/444* (2018.01)

(56) References Cited

U.S. PATENT DOCUMENTS

| | | | | |
|---|---|---|---|---|
| 2011/0312353 A1* | 12/2011 | Banister | ............... | H04B 7/0691 455/500 |
| 2014/0093012 A1* | 4/2014 | Zhang | ............... | H04B 7/0691 375/295 |
| 2017/0026844 A1* | 1/2017 | Baldemair | ........... | H04B 7/0465 |
| 2017/0331670 A1* | 11/2017 | Parkvall | ............... | H04J 11/0079 |
| 2018/0115282 A1* | 4/2018 | Thyagarajan | ......... | H03F 1/0277 |

OTHER PUBLICATIONS

Wang Gaojian et al: "Power Efficiency of Millimeter Wave Transmission Systems with Large Number of Antennas", 2016 IEEE 84th Vehicular Technology Conference (VTC—Fall), IEEE, Sep. 18, 2016 (Sep. 18, 2016), pp. 1-6, XP033079041, DOI: 10.1109/VTCFALL.2016.7881173 [retrieved on Mar. 17, 2017].

Han Shuangfeng et al:"Large-scale antenna systems with hybrid analog and digital beamforming for millimeter wave 5G", IEEE Communications Magazine, IEEE Service Center, Piscataway, US, vol. 53, No. 1,Jan. 1, 2015 (Jan. 1, 2015), pp. 186-194, XP011570636, ISSN; 01636804» DOI; 10.1109/MCOM.2015.7010533 [retrieved on Jan. 14, 2015].

\* cited by examiner

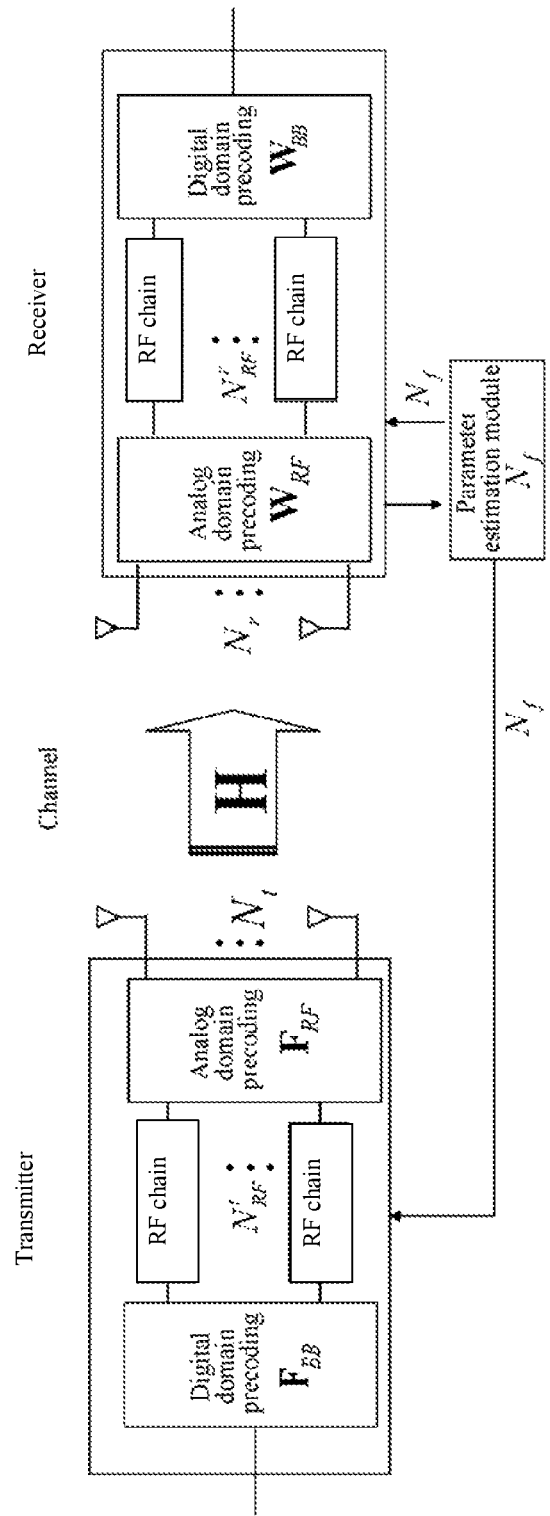

ADAPTIVE PARAMETER ADJUSTMENT METHOD FOR HYBRID PRECODING MILLIMETER-WAVE TRANSMISSION SYSTEM

CROSS REFERENCE TO RELATED APPLICATIONS

Benefit is claimed to Chinese Patent Application No. 201611269597.5, filed Dec. 31, 2016, the contents of which are incorporated by reference herein in their entirety.

BACKGROUND

Technical Field

The present invention relates to an adaptive parameter adjustment method for a hybrid precoding millimeter-wave transmission system, and belongs to the field of wireless communication technologies.

Related Art

It is well known that, a millimeter-wave (mmWave) frequency band may provide a wider wireless spectrum, can greatly improve network capacity, and is one of key technologies of the fifth generation mobile communications (5G). Because power consumption of a millimeter-wave radio frequency (RF) chain is relatively large, when millimeter-wave transmission performance is evaluated, two performance metrics including the transmission rate and power consumption need to be considered at the same time.

Due to the power consumption problem at the RF end, in general, multiple antennas share a common radio frequency chain in the mmWave system. Therefore, the number of configured radio frequency chains is usually less than the number of antennas. In this case, hybrid precoding combining analog precoding and digital precoding becomes an important pre-processing manner for millimeter-wave wireless transmission. In the analog domain, a transmit or receive antenna array controls a beam direction by adjusting phase shift of the antenna array; in the digital domain, signals of multiple radio frequency chains are combined by means of baseband processing. An increase in the radio frequency chain number can effectively improve both the received signal strength and transmission rate, but also increases power consumption overheads. Therefore, in practical applications, how to properly select the number of used radio frequency chains in transmission is still a key problem that needs to be resolved according to the dynamic channel characteristics.

However, current researches on hybrid precoding are mainly focused on problems such as design of a hybrid precoding codebook or rapid beam search for a fixed number of radio frequency chains. In the prior art, researches on a problem about how to adaptively choose to open an appropriate number of radio frequency chains according to a channel propagation environment of a user are insufficient.

SUMMARY

Accordingly, the present invention is directed to provide an adaptive parameter adjustment method for a hybrid precoding millimeter-wave transmission system.

The present invention is further directed to provide a receiver for a hybrid precoding millimeter-wave transmission system.

To achieve the above objectives, the present invention adopts the following technical solution.

According to a first aspect of embodiments of the present invention, an adaptive parameter adjustment method for a hybrid precoding millimeter-wave transmission system, comprising the following step:

a transmitter and a receiver interacting a number of radio frequency chains that need to be used therebetween.

Preferably, according to a received signal power for using a different number of radio frequency chains and a total power consumption for using the different number of radio frequency chains, the receiver calculates the number of the radio frequency chains that need to be used, and transfers to the transmitter the number of the radio frequency chains that need to be used.

Preferably, the total power consumption for the different number of used radio frequency chains comprises at least a total power consumption of the radio frequency chains.

Preferably, the number of the radio frequency chains that need to be used depends on a selection metric value, and the selection metric value is a function of a received signal transmission rate for a predetermined number of used radio frequency chains and a total power consumption for used the predetermined number of radio frequency chains.

Preferably, the received signal rate for the predetermined number of used radio frequency chains, and the total power consumption for the predetermined number of used radio frequency chains are calculated;

a ratio of the received signal rate to the total power consumption is calculated as a selection metric value;

the selection metric values for different predetermine numbers of the used radio frequency chains are calculated; and the number of the radio frequency chains that need to be used is determined according to the selection metric value.

Preferably, different selection metric values obtained at the time of increasing the predetermine number is used as an increment; and the predetermine number corresponding to the increment which is less than the threshold for the first time, is selected as the number of the radio frequency chains that need to be used.

Preferably, different selection metric values obtained at the time of increasing the predetermine number is used as an increment; and the predetermine number corresponding to the increment which is maximum, is selected as the number of the radio frequency chains that need to be used.

Preferably, the selection metric value is $$\beta^{(i)} = \frac{\log_2\left(1 + \frac{q^{(i)}}{\sigma^2}\right)}{p^{(i)}},$$

wherein $q^{(i)}$ is a received signal power for using i radio frequency chains, $\sigma^2$ is a noise power of the received signal, and $p^{(i)}$ is a total radio frequency power consumption for using i radio frequency chains.

Preferably, the selection metric value is $\beta^{(i)} = f(q^i, p^{(i)})$, wherein $q^{(i)}$ is received signal power for using i radio frequency chains, $p^{(i)}$ is a total radio frequency power consumption for using t radio frequency chains, and $f(\cdot)$ is a function form.

According to a second aspect of the embodiments of the present invention, a receiver for a hybrid precoding millimeter-wave transmission system, comprising a parameter estimation module, wherein the parameter estimation module calculates a number of radio frequency chains that need to be used, and transfers the number to a transmitter.

Preferably, according to a received signal power for using different numbers of radio frequency chains and a total power consumption for using the different numbers of radio frequency chains, the receiver calculates the number of the radio frequency chains that need to be used.

Preferably, the number of the radio frequency chains that need to be used depends on a selection metric value, and the selection metric value is a function of a received signal transmission rate for using a predetermined number of radio frequency chains and a total power consumption for using the predetermined number of radio frequency chains.

Preferably, a total received signal power for using the corresponding radio frequency chains is calculated;

a total power consumption for using the corresponding radio frequency chains is calculated;

a selection metric value for using the corresponding radio frequency chains is calculated;

changes of the selection metric value are compared; and the number of the radio frequency chains that need to be established is selected according to the changes of the selection metric value, to implement the interaction between the transmitter and the receiver.

According to the present invention, under a condition of balancing power consumption and a rate, a number of radio frequency chains that need to be established is adaptively selected, so as to optimally configure power consumption and a rate in a millimeter-wave transmission system.

BRIEF DESCRIPTION OF THE DRAWINGS

The present disclosure will become more fully understood from the detailed description given herein below for illustration only, and thus are not limitative of the present disclosure, and wherein:

FIG. 1 is a schematic diagram of a transmission process of a hybrid precoding millimeter-wave transmission system according to an embodiment of the present invention.

DETAILED DESCRIPTION

Technical content of the present invention is described in detail below with reference to accompanying drawings and specific embodiments.

A transmission process of a hybrid precoding millimeter-wave transmission system according to an embodiment of the present invention is shown in FIG. 1. Parameters in FIG. 1 are described as follows:

Transmitter part: the number of transmit antennas $N_t$, the number of maximal configured radio frequency chains $N_{RF}^t$, an independent data stream number $N_s$ an analog precoding matrix $F_{RF}$, and a digital precoding matrix $F_{BB}$.

Receiver part: the number of receive antennas $N_r$, the number of maximal configured radio frequency chains $N_{RF}^r$, an analog domain combined matrix $W_{RF}$, and a digital domain combined matrix $W_{BB}$.

Different from the prior art, in the present invention, in addition to the foregoing parameters, a parameter $N_f$ is newly added, and used to denote the number of radio frequency chains that are practically used in actual transmission, where $1 \leq N_f \leq K = \min(N_{RF}^t, N_{RF}^r)$. In the case of single-user single-stream transmission ($N_s=1$), dimensions of $F_{RF}$ is $N_t \times N_f$ dimensions of $F_{BB}$ is $N_f \times 1$; dimensions of $W_{RF}$ is $N_r \times N_f$; and dimensions of $W_{BB}$ is $N_f \times 1$.

An adaptive parameter adjustment method for a hybrid precoding millimeter-wave transmission system provided in this embodiment of the present invention includes the following steps: a receiver calculating using a parameter estimation module to obtain a number $N_f$ of radio frequency chains that a transmitter and the receiver need to use, where $1 \leq N_f \leq K$; the receiver sending the parameter $N_f$ to the transmitter via a feedback chain; the transmitter using $N_f$ radio frequency chains to transmit signals; and the receiver using $N_f$ radio frequency chains to receive the signals.

Embodiment 1

As shown in FIG. 1, a millimeter-wave transmission system in this embodiment of the present invention is formed of a transmitter and a receiver. Both the transmitter and the receiver use hybrid precoding, and both include a digital domain precoding module and an analog domain precoding module. The receiver further includes a parameter estimation module. The parameter estimation module is respectively connected to the digital domain precoding module and the analog domain precoding module of the receiver.

In this embodiment, it is assumed that single-user single-stream millimeter-wave transmission is used, and a large-scale antenna array is applied. Values of the parameters are as follows: $N_t=100$, $N_r=100$, $N_{RF}^t=4$, $N_{RF}^r=4$, and $N_s=1$. The antenna array uses a uniform linear array, an antenna spacing is a half-wavelength, and the number of analog domain codebooks of the transmitter is $N_1$, where the $l^{th}$ codebook $f_l$ is:

$$f_l = \frac{1}{\sqrt{N_t}} [\, 1 \quad e^{jkd\sin(\phi)} \quad \cdots \quad e^{jkd(N_t-1)\sin(\phi)} \,]^T,$$

where $$\sin(\phi) = -1 + \frac{2l}{N_1}, l=0, 1, \ldots, N_1-1, k=\frac{2\pi}{\lambda}, d=\frac{\lambda}{2}, N_1=2N_t,$$

φ is a departure angle, λ is a wavelength, d is the antenna spacing, and a superscript $(\cdot)^T$ denotes transpose. The number of analog domain codebooks at the receiver is $N_2$ and the $l^{th}$ codebook $w_l$ is:

$$w_l = \frac{1}{\sqrt{N_r}} [\, 1 \quad e^{jkd\sin(\varphi)} \quad \cdots \quad e^{jkd(N_t-1)\sin(\varphi)} \,]^T,$$

where $$\sin(\varphi) = -1 + \frac{2l}{N_2}, l=0, 1, \ldots, N_2-1,$$

$N_2=2N_r$, and φ is an arrival angle.

The digital domains of the transmitter and the receiver use a Discrete Fourier Transform (DFT for short) codebook. A channel model uses an extended Saleh-Valenzuela (SV) model, which is a conventional millimeter-wave channel model. A channel matrix H is denoted as:

$$H = \sqrt{\frac{N_r N_t}{L}} \sum_{l=1}^{L} \alpha_l a_r(\varphi_l^r) a_t(\phi_l^t)^H,$$

where L is the number of paths in space, $\alpha_l$ is a complex gain of each path, $a_r(\varphi_l^r)$ is a receive antenna array response, $\varphi_l^r$ is an arrival angle of the $l^{th}$ path, $a_t(\phi_l^t)$ is a transmit antenna array response, $\phi_l^t$ is a departure angle of the $l^{th}$ path, and a superscript $(\bullet)^H$ denotes conjugate transpose.

In this embodiment, it is assumed that L=10, $\alpha_l$ obeys a Rayleigh distribution, and $\varphi_l^r$ and $\phi_l^t$; obey a Laplace distribution. It is assumed that a power consumption of each radio frequency chain $p_0$=48 mW A noise power is marked as $\sigma^2$.

For one channel implementation H, the receiver first performs beam search according to a conventional method (for example, exhaustive search, or multi-stage search), and records beam pairs whose received signal strength are strongest. In the) present embodiment, an example in which $\min(N_{RF}^t, N_{RF}^r)$=4 beam pairs is illustrated. It is assumed that 4 strongest beam pairs are: $\{f_1, w_1\}$, $\{f_2, w_2\}$, $\{f_3, w_3\}$, and $\{f_4, w_4\}$. That is, when a beam codebook $f_1$ is used in the analog domain of the transmitter, and a beam codebook $w_1$ is used in the analog domain of the receiver, the received signal power is strongest; when a beam codebook $f_2$ is used in the analog domain of the transmitter, and a beam codebook $w_2$ is used in the analog domain of the receiver, the received signal power is second strongest, and so on.

When the parameter estimation module estimates the number of radio frequency chains that need to be used, it is assumed that if 1 radio frequency chain, 2 radio frequency chains, 3 radio frequency chains or 4 radio frequency chains are respectively used, (that is, the radio frequency chains' predetermined number is respectively 1, 2, 3, or 4), the digital domain precoding of the transmitter is preset as $a^{(1)}=1$, $a^{(2)}$, $a^{(3)}$, $a^{(4)}$ and the digital domain precoding of the receiver is preset as $b^{(1)}=1$, $b^{(2)}$, $b^{(3)}$, $b^{(4)}$, where superscripts $(\bullet)^{(1)}$, $(\bullet)^{(2)}$, $(\bullet)^{(3)}$, $(\bullet)^{(2)}$ respectively denote corresponding vectors when the number of radio frequency chains is 1, 2, 3 or 4. The foregoing vectors are respectively taken from columns of a DFT matrix corresponding to the number of used radio frequency chains. Receiving signals corresponding to the number of used radio frequency chains are marked as $\{y_1, y_2, y_3, y_4\}$, and are diagonal elements of the matrix Y whose off-diagonal elements are zero.

Preferably, feedback parameters may be quantized with binary bits, and are then fed back in form of quantization bits.

A specific step in which the parameter estimation module ($N_f$) of the receiver calculates the number of radio frequency chains that need to be used is introduced below.

Received signal strengths in different angle directions are arranged in descending order, K received signals of strongest energy are stored. $\{w_1, w_2, \ldots, w_K\}$ are K corresponding receiver analog beams, $\{f_1, f_2, \ldots, f_K\}$ are K corresponding transmitter analog beams, and $\{y_1, y_2, \ldots, y_K\}$ are corresponding received signals. A diagonal form of $\{y_1, y_2, \ldots, y_K\}$ is $Y=\text{diag}(y_1, y_2, \ldots y_K)$. That is, Y is a diagonal matrix of K×K whose diagonal elements are $\{y_1, y_2, \ldots, y_K\}$, and off-diagonal elements are zero. Because the training beam sent in a beam training process is known, after removing the impact of the training sequence, it has $y_i \approx w_i^H H f_i$, where H is a channel matrix of $N_r \times N_t$. It is assumed that when i radio frequency chains are used (i is a positive integer), the digital domain precoding vector of the transmitter is denoted as: $a^{(i)}=[a_1^{(i)} a_2^{(i)} \ldots a_i^{(i)}]^H$, and a digital domain combined vector at the receiver is denoted as $b^{(i)}=[b_1^{(i)} b_2^{(i)} \ldots b_i^{(i)}]^H$, where i=1, 2, . . . , K.

Step 1: Calculating a total power of i received signals for using i radio frequency chains: $q^{(i)}=|(b^{(i)})^H Y a^{(i)}|^2$, where i=1, 2, . . . , K. That is, received signals powers for using different number of radio frequency chains are calculated. $q^{(1)}=(b^{(1)})^H Y a^{(1)}$ is the received signals power for using 1 radio frequency chain, $q^{(2)}=(b^{(2)})^H Y a^{(2)}$ is the received signals power for using 2 radio frequency chains, $q^{(3)}=(b^{(3)})^H Y a^{(3)}$ is the received signals power for using 3 radio frequency chains, and $q^{(4)}=(b^{(4)})^H Y a^{(4)}$ is the received signals power for using 4 radio frequency chains.

Step 2: Calculating a total power consumption $p^{(i)}$ for using i radio frequency chains. As an example, in this embodiment of in the present invention, only the radio frequency power consumption is considered, i.e., the power consumptions such as basedband processing is not considered. And it is assumed that the power consumption of each radio frequency chain is approximately equal, that is, $p^{(i)} \approx 2i \times p_0$ where $p_0$ is the power consumption of each radio frequency chain. Therefore, in this embodiment, the radio frequency total power consumption respectively for using 1, 2, 3 or 4 radio frequency chains are: $p^{(1)} \approx 2 p_0$, $p^{(2)} \approx 4 p_0$, $p^{(3)} \approx 6 p_0$, or $p^{(4)} \approx 8 p_0$. In practice, the total power consumption may also include a power consumption of a baseband, for example, $p^{(i)} \approx 2i \times p_0 + t_i$, where $t_i$ is a baseband power consumption for using i radio frequency chains.

Step 3: Calculating a selection metric value of i radio frequency chains:

$$\beta^{(i)} = \frac{\log_2\left(1 + \frac{q^{(i)}}{\sigma^2}\right)}{p^{(i)}},$$

where i=1, 2, . . . , K, $\sigma^2$ is a total noise power. The formula denotes a ratio of a transmission rate to a power consumption. When the predetermined number is 1, 2, 3, or 4, the selection metric values for using 1, 2, 3 or 4 radio frequency chains are respectively:

$$\beta^{(1)} = \frac{\log_2\left(1 + \frac{q^{(1)}}{\sigma^2}\right)}{p^{(1)}}, \beta^{(2)} = \frac{\log_2\left(1 + \frac{q^{(2)}}{\sigma^2}\right)}{p^{(2)}},$$

$$\beta^{(3)} = \frac{\log_2\left(1 + \frac{q^{(3)}}{\sigma^2}\right)}{p^{(3)}}, \text{ or } \beta^{(4)} = \frac{\log_2\left(1 + \frac{q^{(4)}}{\sigma^2}\right)}{p^{(4)}}.$$

As the number of used radio frequency chains gradually increases, the selection metric value correspondingly changes. In this embodiment, the predetermined number of the radio frequency chains is increased by 1, that is, one more radio frequency chain is used, the selection metric value after the predetermined number of the radio frequency chains is increased and the selection metric value before the predetermined number is increased are respectively calculated. Then an absolute value of a difference between the former and the latter is used as an increment of the selection metric value.

Step 4: Comparing changes of the selection metric value.

In this embodiment, the change of the selection metric value, is a difference of the increment of the selection metric value, that is, $|\beta^{(2)}-\beta^{(1)}|, |\beta^{(3)}-\beta^{(2)}|, \ldots, |\beta^{(K)}-\beta^{(K-1)}|$. When the increment is less than a preset threshold ε, comparison is stopped and the number of the radio frequency chains that need to be used is determined. The threshold ε may be configured by a user, provided that the threshold itself is a positive real number. If the preset threshold is relatively large, it indicates that the millimeter-wave transmission system prefers a power consumption requirement. If the preset threshold is relatively small, it indicates that the millimeter-wave transmission system prefers a rate requirement.

A person skilled in the art may understand that, the metric value may be defined in another way. For example, $$\beta^{(i)} = \frac{m_t * \log_2\left(1 + \frac{q^{(i)}}{\sigma^2}\right)}{m_p * p^{(i)}},$$

that is, the numerator and the denominator are respectively multiplied by a weighted value that is a positive real number, a different weighted indicates that a different requirement prefer the rate or the power consumption. The foregoing example is a specific case of $m_t=m_p=1$. Alternatively, the change of the metric value may be denoted in another way, for example, in a ratio form such as $$\frac{\beta^{(i+1)}}{\beta^{(i)}}.$$

Step 5: Selecting a number of radio frequency chains that need to be used.

In this embodiment of the present invention, the number of the radio frequency chains that need to be used depends on, the ratio of the received signal transmission rate when the predetermined number of radio frequency chains are used, to total radio frequency power consumption when the predetermined number of radio frequency chains are used. This ratio may be a transmission rate divided by a power consumption, or may be a power consumption divided by a rate. The ratio of a transmission rate to a power consumption is used as an example. In this embodiment, the number of the radio frequency chains that need to be used is selected as $$N_f = \begin{cases} k, & k \text{ makes } \min_k(|\beta^{(k+1)} - \beta^{(k)}| \le \varepsilon), \\ K, & \text{if } |\beta^{(K)} - \beta^{(K-1)}| > \varepsilon \end{cases}$$

k=1, 2, . . . , K−1, where $$\min_k(\cdot), k = 1, 2, \ldots K - 1$$

denotes a value of k corresponding to that the increment satisfies an inequality within brackets for the first time (that is, less than the threshold) when the value of k increases from 1 to K−1.

When no value of k is less than the threshold, all radio frequency chains need to be used.

ε is the preset threshold, and is a positive real number. The threshold ε is configured by a user. When the threshold is set to a relatively large value, it indicates that the power consumption preferred to the transmission rate; when the threshold is set to a relatively small value, it indicates that the transmission rate is preferred.

$\sigma^2$ is a noise power estimated in advance.

It is assumed that $|\beta^{(2)}-\beta^{(1)}|>\varepsilon$, and $|\beta^{(3)}-\beta^{(2)}|\le\varepsilon$. It indicates that a metric gain brought about by additional third radio frequency chain is less than the predetermined threshold. In other words, when the third radio frequency chain is additionally used, compared with the increase in the power consumption, a relative increase value of the transmission rate is less than the predetermined threshold, and therefore a benefit of adding the third radio frequency chain may be ignored. In this case, the number of the established radio frequency chains is selected as $$N_f = \min_k(|\beta^{(k+1)} - \beta^{(k)}| \le \varepsilon) = 2.$$

Step 6: After calculating $N_f$, the receiver feeds back the information to the transmitter in subsequent transmission through an uplink chain. As an optional feedback form, $N_f$ may be subjected to binary quantization and then be fed back. For example, 2 bits are used to perform quantization, where {00} corresponds to $N_f=4$, {01} corresponds to $N_f=1$, {10} corresponds to $N_f=2$, and {11} corresponds to $N_f=3$. If $N_f=1$ is calculated, bits to be fed back are {01}.

In an uplink control channel, a multi-bit control domain is newly added to indicate the number of established radio frequency chains. A value is assigned to the control domain according to the calculated parameter value, and the information is carried to the transmitter by means of the uplink control channel.

It should be noted that, although the foregoing method is mainly directed to single-user single-stream millimeter-wave transmission, the method provided in the present invention may also be applied to multi-user multi-stream millimeter-wave transmission. Additionally, although the foregoing method is mainly directed to millimeter-wave transmission, the foregoing method may also be applied to non-millimeter-wave transmission in other high frequency bands.

Embodiment 2

In this embodiment of in the present invention, multiple manners may be used for a calculation method for selecting the number of used radio frequency chains. For example, in addition to performing selection by constraining the threshold in Embodiment 1, as an alternative solution, selection may be performed by directly using the change of the metric increment. That is, the radio frequency chain number when the increment is maximum is selected. An example is described as follows: totally 4 radio frequency chains are used as an example, and it is assumed that when 2 radio frequency) chains are used, the increment is $|\beta^{(2)}-\beta^{(1)}|$, when 3 radio frequency chains are used, the increment is $|\beta^{(3)}-\beta^{(2)}|$, and when 4 radio frequency chains are used, the increment) is $|\beta^{(4)}-\beta^{(3)}|$. If $|\beta^{(2)}-\beta^{(1)}|>|\beta^{(3)}-\beta^{(2)}|$, and $|\beta^{(2)}-\beta^{(1)}|>|\beta^{(4)}-\beta^{(3)}|$, 2 radio frequency chains are selected to be established according to a maximum increment principle.

In this embodiment, the maximum increment indicates that a metric value change brought about by a newly added radio frequency chain reaches maximum. As decision making, although the maximum increment method causes less precision than that of the threshold method, its calculation is simpler.

However, in this embodiment, it might exists transmission rate loss. Totally 4 radio frequency chains in the above are still used as an example. It is assumed that when 2 radio frequency chains are used, the increment is $|\beta^{(2)}-\beta^{(1)}|=10$, when 3 radio frequency chains are used, the increment is $|\beta^{(3)}-\beta^{(2)}|=9$, and when 4 radio frequency chains are used, the increment is $|\beta^{(4)}-\beta^{(3)}|=8$. Therefore, 2 chains are selected to be used according to the maximum increment method. However, actually, the increment brought about by 3 radio frequency chains is 9, the increment brought about by 4 radio frequency chains is 8, which are both quite considerable gains. In this case, if 2 radio frequency chains are selected, the transmission rate is lost to some extent.

In this case, according to the threshold method, if the threshold $\varepsilon=5$, 4 radio frequency chains could be selected because $|\beta^{(4)}-\beta^{(3)}|>\varepsilon$.

The foregoing values (10, 9, 8, and 5) of the increment or the threshold are used as examples for description, but are not actual values.

Embodiment 3

In this embodiment of in the present invention, multiple forms may be used for the selection metric for measuring the changes of the power consumption and the transmission rate. For example, $\beta^{(i)}=f(q^{(i)}, p^{(i)})$, where $f(\bullet)$ is a function form, $q^{(i)}$ is a received signal power at the time of i radio frequency chains are used, and $p^{(i)}$ is a total power consumption for using i radio frequency chains are used. In this embodiment, another method for calculating the selection metric is provided. That is, a selection metric value of i radio frequency chains may be denoted as $$\beta^{(i)} = \frac{p^{(i)}}{\log_2\left(1 + \frac{q^{(i)}}{\sigma^2}\right)},$$

which means that the selection metric value is a ratio of the power consumption to the transmission rate. When a predetermined number is 1, 2, 3, or 4, the selection metric values respectively of the predetermined number of radio frequency chains are:

$$\beta^{(1)} = \frac{p^{(1)}}{\log_2\left(1 + \frac{q^{(1)}}{\sigma^2}\right)}, \beta^{(2)} = \frac{p^{(2)}}{\log_2\left(1 + \frac{q^{(2)}}{\sigma^2}\right)},$$

$$\beta^{(3)} = \frac{p^{(3)}}{\log_2\left(1 + \frac{q^{(3)}}{\sigma^2}\right)}, \text{ or } \beta^{(4)} = \frac{p^{(4)}}{\log_2\left(1 + \frac{q^{(4)}}{\sigma^2}\right)}.$$

As the number of used radio frequency chains gradually increases, the selection metric value correspondingly changes. In this embodiment, once the value of the predetermined number increases 1 (one more radio frequency chain is established), the selection metric value after the value of the predetermined number is increased and a selection metric value before the value of the predetermined number is increased are both calculated. The absolute value of the difference between the former and the latter is used as an increment of the selection metric value. The increment changes of the selection metric value, that is, $|\beta^{(2)}-\beta^{(1)}|$, $|\beta^{(3)}-\beta^{(2)}|$, ..., $|\beta^{(K)}-\beta^{(K-1)}|$ are compared. When the increment is less than the preset threshold $\varepsilon$, comparison is stopped. In this case, a corresponding chain number is the selected number of radio frequency chains that need to be established.

It may be understood that, other non-ratio forms may be used for the expression of the selection metric value $\beta^{(i)}$ in addition to the foregoing ratio form. For example, considering that the radio frequency total power consumption is approximately a linear function of the radio frequency chain number, the selection metric value $\beta^{(i)}$ may be directly defined as the transmission rate increment, that is, $$\beta^{(i)} = \log\left(1 + \frac{q^{(i)}}{\sigma^2}\right) - \log\left(1 + \frac{q^{(i-1)}}{\sigma^2}\right).$$

Still, 4 radio frequency chains are used as an example. Here, $\beta^{(2)}$, $\beta^{(3)}$, $\beta^{(4)}$ respectively denote the rate increments of 2, 3, and 4 radio frequency chains respectively compared with 1, 2, and 3 radio frequency chains. If $\beta^{(2)}>\beta^{(3)}$, and $\beta^{(2)}>\beta^{(4)}$, that is, the selection metric value for using 2 chains is maximum, the selected number of radio frequency chains is thus set 2. The method is relatively simple, but a minimum number of used radio frequency chains is 2. Therefore, an additional calculation method needs to be used when selection is performed between a radio frequency chain number of 1 and a radio frequency chain number of 2.

The adaptive parameter adjustment method for a hybrid precoding millimeter-wave transmission system provided in the present invention is described in detail above. Any apparent modification made to the present invention by persons of ordinary skill in the art without departing from the essence of the present invention constitutes violation on patent rights of the present invention, and the persons should bear corresponding legal liabilities.

What is claimed is:

1. An adaptive parameter adjustment method for a hybrid precoding millimeter-wave transmission system, comprising the following step:
    a transmitter and a receiver interacting a number of radio frequency chains that need to be used therebetween, the number of the radio frequency chains that need to be used depends on a selection metric value; and
    the selection metric value is $$\beta^{(i)} = \frac{\log_2\left(1 + \frac{q^{(i)}}{\sigma^2}\right)}{p^{(i)}} \text{ or } \beta^{(i)} = \frac{p^{(i)}}{\log_2\left(1 + \frac{q^{(i)}}{\sigma^2}\right)},$$

wherein $q^{(i)}$ is a received signal power for using i radio frequency chains, $\sigma^2$ is a noise power of the received signal, and $p^{(i)}$ is a total radio frequency power consumption for using i radio frequency chains.

2. The adaptive parameter adjustment method according to claim 1, wherein:
    according to a received signal power for using a different number of radio frequency chains and a total power consumption for using the different number of radio frequency chains, the receiver calculates the number of the radio frequency chains that need to be used, and transfers to the transmitter the number of the radio frequency chains that need to be used.

3. The adaptive parameter adjustment method according to claim 2, wherein:
the total power consumption for using the different number of radio frequency chains comprises at least a total power consumption of the radio frequency chains.

4. The adaptive parameter adjustment method according to claim 1, wherein:
the received signal rate for using the predetermined number of radio frequency chains, and the total power consumption for using the predetermined number of radio frequency chains are calculated;
a ratio of the received signal rate to the total power consumption is calculated as a selection metric value;
the selection metric values for different predetermine numbers of the used radio frequency chains are calculated; and
the number of the radio frequency chains that need to be used is determined according to the selection metric value.

5. The adaptive parameter adjustment method according to claim 4, wherein:
different selection metric values obtained at the time of increasing the predetermine number is used as an increment; and
the predetermine number corresponding to the increment which is less than the threshold for the first time, is selected as the number of the radio frequency chains that need to be used.

6. The adaptive parameter adjustment method according to claim 4, wherein:
different selection metric values obtained at the time of increasing the predetermine number is used as an increment; and
the predetermine number corresponding to the increment which is maximum, is selected as the number of the radio frequency chains that need to be used.

7. The adaptive parameter adjustment method according to claim 1, comprising the following steps:
calculating a total received signal power for using the corresponding radio frequency chains;
calculating a total power consumption for using the corresponding radio frequency chains;
calculating a selection metric value for using the corresponding radio frequency chains;
comparing changes of the selection metric value; and
according to the changes of the selection metric value, selecting the number of the radio frequency chains that need to be used, to implement the interaction between the transmitter and the receiver.

8. A receiver for a hybrid precoding millimeter-wave transmission system, comprising a parameter estimation module, wherein
the parameter estimation module calculates a number of radio frequency chains that need to be used, and transfers the number to a transmitter, the number of the radio frequency chains that need to be used depends on a selection metric value; and
the selection metric value is $$\beta^{(i)} = \frac{\log_2\left(1 + \frac{q^{(i)}}{\sigma^2}\right)}{p^{(i)}} \text{ or } \beta^{(i)} = \frac{p^{(i)}}{\log_2\left(1 + \frac{q^{(i)}}{\sigma^2}\right)},$$

wherein $q^{(i)}$ is a received signal power for using i radio frequency chains, $\sigma^2$ is a noise power of the received signal, and $p^{(i)}$ is a total radio frequency power consumption for using i radio frequency chains.

9. The receiver for a hybrid precoding millimeter-wave transmission system according to claim 8, wherein:
a total received signal power for using the corresponding radio frequency chains is calculated;
a total power consumption for using the corresponding radio frequency chains is calculated;
a selection metric value for using the corresponding radio frequency chains is calculated;
changes of the selection metric value are compared; and
the number of the radio frequency chains that need to be established is selected according to the changes of the selection metric value, to implement the interaction between the transmitter and the receiver.

* * * * *